United States Patent
Osa et al.

(10) Patent No.: US 10,764,734 B2
(45) Date of Patent: Sep. 1, 2020

(54) SERVICE OPERATION MANAGEMENT USING NEAR-FIELD COMMUNICATIONS

(71) Applicant: Intel Corporation, Santa Clara, CA (US)

(72) Inventors: Markus Osa, Tampere (FI); Rauno Tamminen, Tampere (FI)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 15/278,638

(22) Filed: Sep. 28, 2016

(65) Prior Publication Data

US 2018/0091491 A1 Mar. 29, 2018

(51) Int. Cl.

| | |
|---|---|
| *G06F 7/04* | (2006.01) |
| *G06F 15/16* | (2006.01) |
| *H04L 29/06* | (2006.01) |
| *H04W 4/80* | (2018.01) |
| *H04B 5/00* | (2006.01) |
| *H04W 12/08* | (2009.01) |
| *H04W 12/06* | (2009.01) |
| *H04L 29/08* | (2006.01) |

(52) U.S. Cl.
CPC ............ *H04W 4/80* (2018.02); *H04B 5/0031* (2013.01); *H04L 67/303* (2013.01); *H04W 12/06* (2013.01); *H04W 12/08* (2013.01)

(58) Field of Classification Search
CPC ......... H04L 63/08; H04L 63/10; H04L 67/42; H04L 4/08; H04W 4/80
See application file for complete search history.

(56) References Cited

U.S. PATENT DOCUMENTS

| | | | | |
|---|---|---|---|---|
| 2004/0002799 | A1* | 1/2004 | Dabbish | B60R 16/0231 701/32.6 |
| 2005/0063567 | A1* | 3/2005 | Saitoh | G07C 9/37 382/115 |
| 2007/0241182 | A1* | 10/2007 | Buer | G06Q 20/341 235/380 |
| 2008/0224825 | A1* | 9/2008 | Nystrom | G06K 7/0008 340/10.1 |
| 2010/0278345 | A1* | 11/2010 | Alsina | H04L 63/0492 380/283 |

(Continued)

*Primary Examiner* — John B King
*Assistant Examiner* — Darshan I Dhruv
(74) *Attorney, Agent, or Firm* — Schwegman Lundberg & Woessner, P.A.

(57) ABSTRACT

Various techniques for the management and control of service operations using near-field communication (NFC) technologies are disclosed. In an example, a master computing system operates to identify a device configuration that enables a service operation upon a remote client device, identify an authentication value to authenticate permission to enable the service operation with the remote client device, and generate an NFC data payload including the authentication value and device configuration. This data payload is then provided to a client computing device that operates an NFC reader. In response, the client computing device processes and authenticates the payload, and enables the indicated service operation(s) within the client computing device. Further examples to conduct the NFC data transaction and perform the service operation(s) using active and passive NFC tags are also disclosed.

25 Claims, 8 Drawing Sheets

(56) References Cited

U.S. PATENT DOCUMENTS

| | | | | |
|---|---|---|---|---|
| 2012/0315848 | A1* | 12/2012 | Smith | H04B 5/02 |
| | | | | 455/41.1 |
| 2013/0127602 | A1* | 5/2013 | Jantunen | H04W 52/0274 |
| | | | | 340/10.51 |
| 2013/0215467 | A1* | 8/2013 | Fein | G06F 3/1204 |
| | | | | 358/1.15 |
| 2013/0225080 | A1* | 8/2013 | Doss | H04L 63/10 |
| | | | | 455/41.2 |
| 2013/0268444 | A1* | 10/2013 | Namgoong | G06Q 20/40145 |
| | | | | 705/71 |
| 2014/0227976 | A1* | 8/2014 | Callaghan | G06F 8/65 |
| | | | | 455/41.2 |
| 2015/0038086 | A1* | 2/2015 | Kim | H04W 12/0602 |
| | | | | 455/41.3 |
| 2015/0093988 | A1* | 4/2015 | Konanur | H04B 5/0012 |
| | | | | 455/41.1 |
| 2015/0186541 | A1* | 7/2015 | Vega | G06F 16/9566 |
| | | | | 705/26.8 |
| 2015/0326539 | A1* | 11/2015 | Sharma | H04L 63/10 |
| | | | | 713/168 |
| 2015/0326584 | A1* | 11/2015 | Karame | G06F 21/51 |
| | | | | 726/30 |
| 2016/0011835 | A1* | 1/2016 | Igarashi | G06F 3/126 |
| | | | | 358/1.15 |
| 2016/0212103 | A1* | 7/2016 | Rhoads | H04W 12/02 |
| 2017/0003922 | A1* | 1/2017 | Sone | G06F 3/1238 |
| 2017/0019389 | A1* | 1/2017 | Shet | H04L 63/08 |
| 2018/0077125 | A1* | 3/2018 | Elhard | H04L 63/045 |

\* cited by examiner

SERVICE OPERATION MANAGEMENT USING NEAR-FIELD COMMUNICATIONS

TECHNICAL FIELD

Embodiments described herein generally relate to security and authorization techniques used for controlling software and hardware functions of electronic devices, and, for some examples, the use of security and authorization techniques to control service operations in an electronic device with near field communication mechanisms.

BACKGROUND

Many electronic devices (e.g., mobile devices such as phones and tablets) include a product lifecycle that is denoted by stages, transitioning from device manufacturing, to research and development, to device care and repair. In each of these stages, specific service operations may be performed on the electronic device. Some of these service operations are security sensitive, and may involve enabling features or access to data that is normally locked down. For example, sensitive security operations may include enabling trace debug capabilities and retrieving logs from a malfunctioning device returned to the original equipment manufacturer (OEM), enabling provisioning of a Wi-Fi MAC or Bluetooth address during device manufacturing, among many other types of operations.

Allowing sensitive service operations to be always enabled on consumer devices is not an appropriate choice in many circumstances, because such service operations could be used by malware or end users to compromise OEM or vendor assets (or even to perform unsecure activities with the device). Additionally, the OEM may incur legal consequences from failing to meet contractual obligations in adequately protecting such assets. Many existing techniques for enabling these service operations on a particular device involve the usage and setup of complex, costly, and often inadequate external tools and infrastructure. Further, many workarounds for enabling service operations on a device involve complex authorization techniques that are not easily controllable or deployable by a device manufacturer, OEM, or vendor.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, device components, and related apparatuses are disclosed that utilize short-range wireless communication techniques for authorizing an electronic device for service operations. In an example, the presently described techniques and configurations utilize near-field communications (NFC). NFC provides for a context-aware and easy-to-automate solution for transferring required credentials and commands between NFC endpoints, with such credentials and commands used to authorize specific service operations without reliance on the availability of a backend infrastructure. As discussed herein, NFC tags or interactions between two NFC-enabled endpoints may be used for transferring the required credentials and authorization to control (e.g., enable, disable, activate, deactivate, switch, toggle), perform (e.g., initiate, execute, schedule, invoke), and modify (e.g., update, remove, change) a variety of administrative and service operations that are available on a target device.

The techniques discussed herein allow manufacturers and OEMs to maintain a high-level of robustness and security for their products throughout the device lifecycle, including at research and development, product manufacturing and deployment, and support and product care phases. Further, the techniques allow for authentication of data validity and verification of authorization to control the respective service operations. These techniques and the accompanying configurations described herein drastically simplify the infrastructure and steps involved for the control and performance of service operations, by using NFC interactions to communicate with a target device for a particular service operation.

In an example, an NFC interaction is used to provide a context-aware and automation-capable mechanism to transfer required authentication credentials between NFC endpoints. These credentials may accompany a payload that specifies a particular configuration for enabling the service operations. Thus, in some examples, the NFC interaction may be used to offer controlled data exchanges among NFC endpoints, without the use of a backend infrastructure to sign and verify the data configuration.

Figure 1:
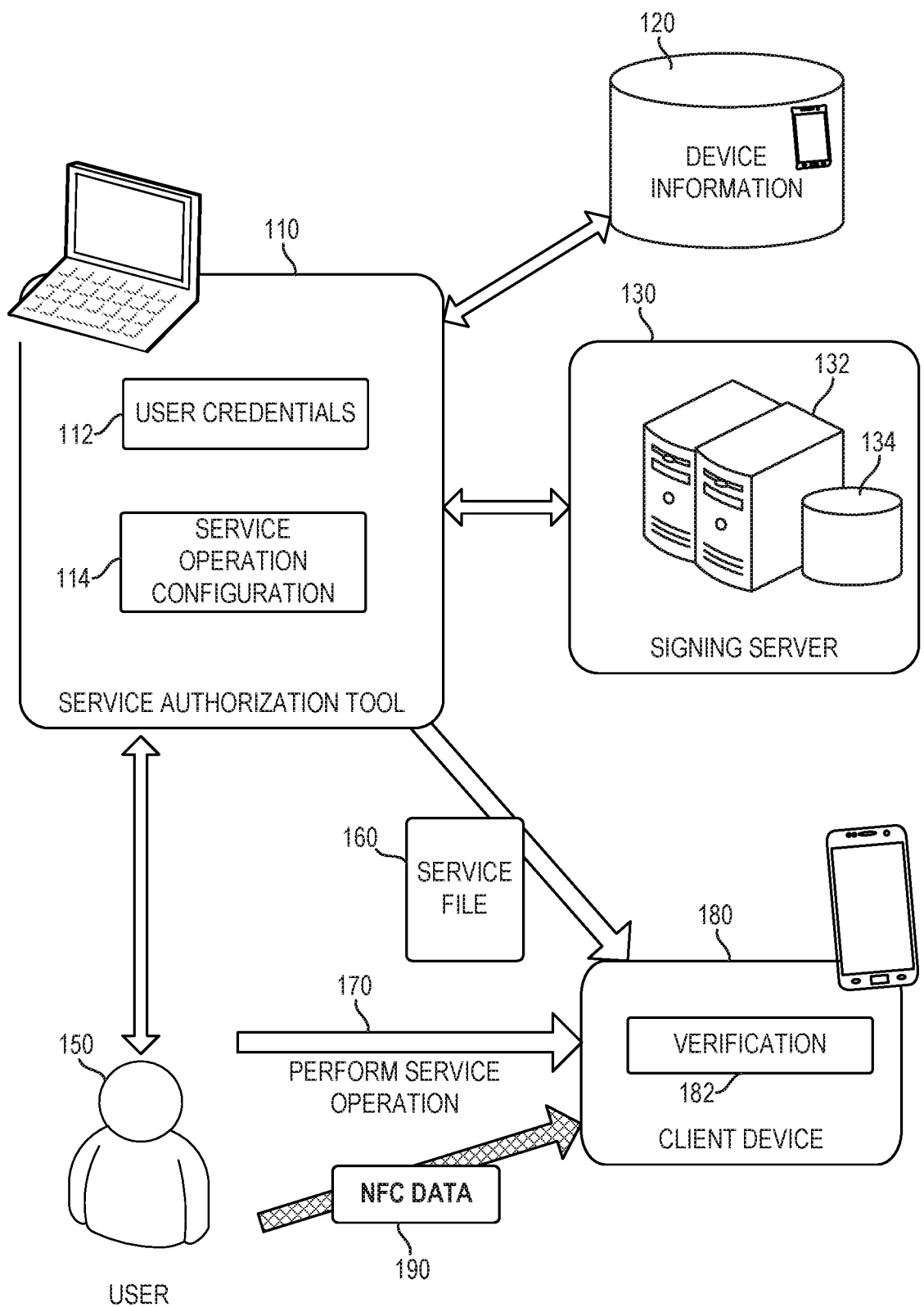
FIG. 1 illustrates an overview of a service operation environment, according to an example.

FIG. 1 illustrates an overview of an example service operation environment. It will be understood that additional components and circuitry not depicted in FIG. 1 may be used for variations of the following data processing and communication techniques. As shown, a service authorization tool 110 operates on a computing system to generate and output service operation controls for a client device 180. The service authorization tool 110, under the command of a user 150, includes functions (user credential selection 112, and service operation configuration 114) to generate data used to enable the performance of a service operation 170. In response to the receipt and processing of this data at the client device 180, the specific service operation may be performed (as shown in activation of the service operation 170) by the user 150.

Previous mechanisms for authorizing the client device 180, involving the use of the service authorization tool 110 to enable and to perform the service operations, have involved the usage (and setup) of complex and costly external tools and infrastructure. For example, one existing mechanism to enable a service operation involves the generation of a binary file (e.g., a service file 160) from the service authorization tool 110, that contains a cryptographic signature and device- or circuitry-specific identifiers (e.g., obtained from a device information source 120, in some cases directly from the client device 180, and signed by the signing server 130). This binary file would be used to authorize a given device (e.g., the client device 180) to enable the service operations, once the binary file is verified (e.g., by verification operations 182) and consumed by the device. For example, the binary file might be consumed during bootup of the device to enter a special state of the device, after which the user 150 could provide a command to launch the service operation. However, from a security point of view, use of a dedicated binary file provides additional risk of unauthorized distribution (especially if the binary file is generated for a group of devices, and not on a device-by-device basis).

Additionally, generation of binary files traditionally requires live access to a signing infrastructure and backend servers (such as the signing server 130 and associated data processing system 132 and data sources 134), incurring dependencies on network availability as well as additional cost in setting up and maintaining the infrastructure. Network availability is traditionally an issue for most OEM device manufacturing lines, because such manufacturing lines tend to lack access to supporting backend and network infrastructure for generating such custom data on the fly. Thus, the tools and steps involved in generating and utilizing binary files for deployment are complex and dependent on each other. Such traditional binary file-based mechanisms have also relied on storing the authorization data in non-volatile storage, thus making it susceptible for replay attacks, because once the file(s) is/are leaked, the file may be re-introduced to the device by an unauthorized adversary for re-enabling the sensitive operations.

Some existing mechanisms have been deficient in enabling the operations in a single-operation manner, for a single boot-cycle of a device, without compromising the overall security of the solution. In contrast to the existing techniques of signing, deploying, and designing specialized files, the techniques described herein enable lightweight communications and data exchanged through wireless and lightweight NFC operations. In the configuration of FIG. 1, this is shown by the use of NFC data 190 that includes an authorization and service operation specification directly to the client device 180. Thus, in contrast to mechanisms that involve signed, device-bound files (such as service file 160) for authorizing the enabling of the service operations, the following techniques utilize NFC interactions between the service authorization tool 110 and the client device 180— allowing the client device 180 to proceed with the expected verification operations 182, and the performance of the service operation 170.

The presently described NFC-based service operation management techniques may be applied to a number of scenarios involving device operation and control. These scenarios may include:

Secure and simplified authorization—such as may be used during OEM device manufacturing, with the addition of an NFC-based authorization step as a physical step in the device manufacturing line. For example, an NFC interaction may be used to authorize the device for certain security-sensitive manufacturing stages, such as Wi-Fi or Bluetooth address provisioning, secure storage initialization, modem calibration data storage, and the like. NFC-based authorization data may be used and stored by the target device only in volatile memory, to automatically ensure that the device is not shipped with sensitive authorization data still resident within the device.

Simplified service tag retrieval—such as may be used during service care options, with the use of NFC-obtained information to validate or authenticate OEM Care invoices (for third party-owned OEM service facilities) as being originated from operations performed on a factual OEM device. NFC-based communication could be used as an easy-to-use mechanism for retrieving Service Tag information by sweeping the device with another authorized NFC-enabled device. For example, an Invoice ID could be transferred to device through NFC, the device would sign the ID with a device-specific key, and then the device would return the signature back to the host through NFC for tracking and billing purposes.

Simplified research and development, product support and care operations—such as may be authorized on the device for research and development-related operations (e.g., Wi-Fi MAC re-provisioning), simply by sweeping the misbehaving device (the Client Device) with a valid NFC tag (e.g. embedded in an employee ID card) or another authorized NFC-enabled device (the Master Device). With use of a Master-Client NFC deployment, discussed below with reference to FIG. 2, an application on the Master Device may be used for defining what operations are enabled on the Client Device side.

The types of NFC data communications used may implement any number of NFC standards, including those defined by the NFC Forum and ISO/IEC specifications. As discussed in the following examples, required authentication credentials, authorization data, and additional metadata defining the requested service operations may be retrieved from an NFC Tag (in an NFC-Tag model) or another NFC-enabled device (in a Master-Client model), allowing the receiving device to enable the requested services in a controlled manner without depending on costly and complex tools and backend infrastructure availability.

NFC operations in a Master-Client model may involve the use of NFC peer-to-peer (NFC P2P) communication, involving two active hosts or endpoints that are communicating using NFC. This may be particularly useful in settings involving manufacturing and controlled access of the target device and the NFC source. For example, an NFC P2P communication may be accompanied by logging and tracking of the service operation, including active management and control when the NFC data is available, which employee used the device, and the like. An example of NFC P2P communication in a master-client setting is described below in FIG. 2.

NFC operations in an NFC-Tag model may involve the use of a passive NFC tag (such as an NFC or RFID tag). With the use of an NFC tag, only one party—the target device—needs to be actively communicating. The target device may access a passive NFC tag that is pre-programmed to authorize some operation, and enable and provide credentials, when placed in proximity with the device. In this scenario, the NFC reader of the device requests credentials and the service configuration, receives the credentials and configuration from the tag, and then responds accordingly. An example of NFC tag in an NFC-Tag setting is described below in FIG. 3. Due to the security considerations of providing a physical tag, this scenario may be most applicable to research and development, manufacturing, or pre-deployment settings, such as when specialized operations on a manufacturing line are authorized for limited purposes based on data programmed into the NFC tag.

Figure 2:
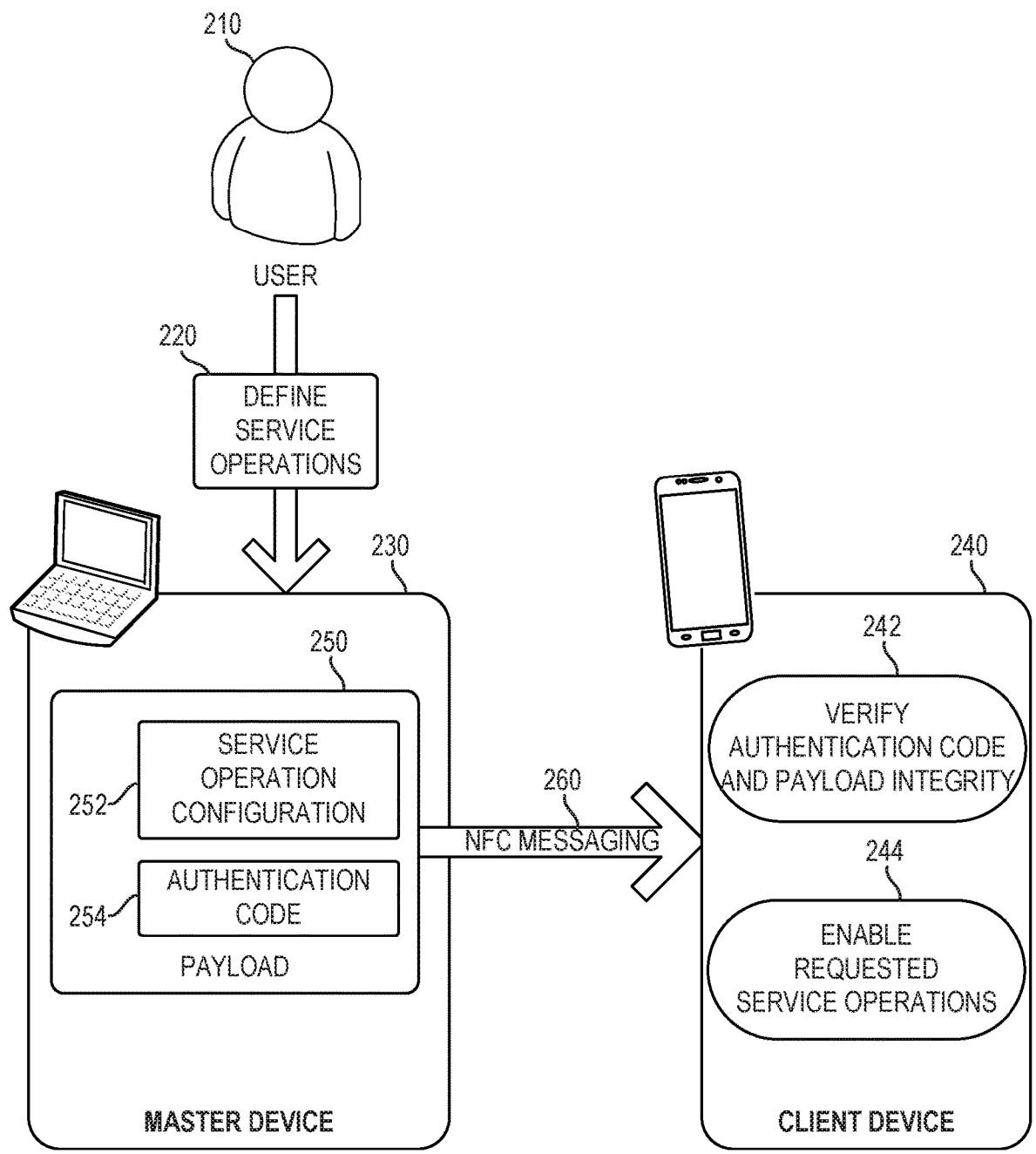
FIG. 2 illustrates master-client near-field communication techniques used for authorizing service operations, according to an example.

FIG. 2 illustrates example master-client NFC data communication techniques used for authorizing service operations. In a Master-Client model, shown in FIG. 2, an NFC-enabled device, a master device 230 is pre-provisioned with required credentials for authorizing target devices, such as the client device 240, to enable (and, if appropriate, perform) the service operations.

First, a user 210 defines requested service operations 220 to enable on the client device 240, such as through a software application operating on the master device 230. The master device 230 generates an NFC payload 250 with the requested service operation configuration 252. The master device 230 further generates an authentication value 254 (e.g., identifier, token, code) for the payload (such as an RSA signature, a keyed-hash message authentication code (HMAC), etc.) using pre-provisioned secrets (e.g., a RSA private key, a symmetric secret key, etc.).

The NFC operations are then conducted, to transmit the payload through NFC, from the master device 230 to the client device 240. The client device 240, in response to receipt of the payload 250, performs operations to verify the authentication credentials and payload integrity, with verification operations 242. In an example, NFC communication 260 of the payload may include a one-way communication of required credentials (such as an authorization value) from the master device 230 to the client device 240; in another example, the NFC communication 260 may be used to exchange a two-way challenge-response handshake protocol for added security. Upon successful verification, the client device 240 enables the requested service operations on the device, with implementation operations 244.

Additional mechanisms may be enforced on the master device 230 during the pre-provisioning phase to limit the scope of the authorization capabilities for the master device 230 (such as what operations may be authorized, how many times, for how long, for which product lines, and the like) to limit the risk of misuse of the master device capabilities. Additional features to perform or trigger the service operations may be provided in response to receipt of the payload 250, or in response to other interaction with the client device 240. Other authentication and data exchange activities may be accompanied with use of the NFC Master-Client model.

Figure 3:
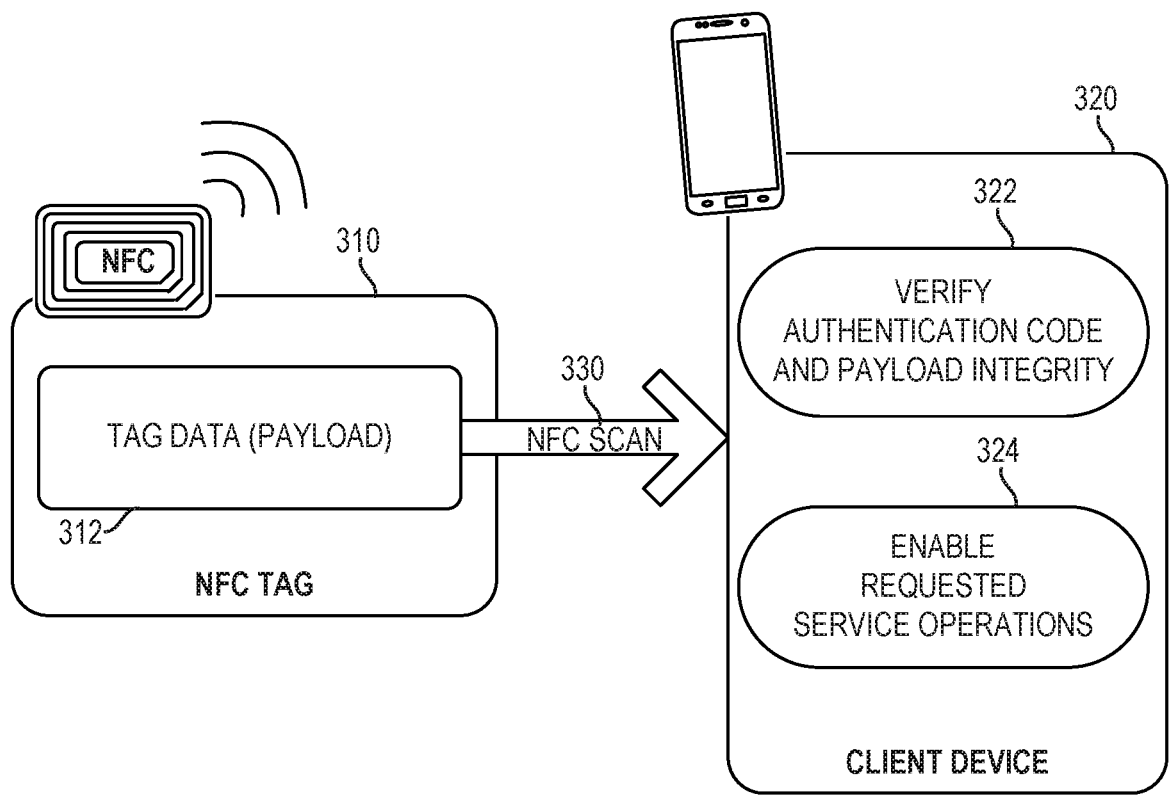
FIG. 3 illustrates near-field communication data retrieval techniques used for authorizing service operations, according to an example.

FIG. 3 illustrates example near-field communication data retrieval techniques used for authorizing service operations with NFC interactions. In a Tag model, shown in FIG. 3, an NFC-enabled device, a client device 320, includes an NFC reader to perform an NFC scan 330 of an NFC tag 310. The NFC tag 310 includes a preprogrammed payload, in tag data 312, which is communicated in response to activation from the NFC reader.

In the Tag model, the client device 320 operates to enable NFC tag scanning, perform the NFC scan 330, and retrieve the payload from the tag data 312. The client device 320 proceeds to verify the authentication value and the payload integrity of the tag data 312, with verification operations 322. Upon successful verification, the payload is interpreted to identify indicated service operations, and the indicated service operations are enabled on the client device 320, with implementation operations 324. Additional features to perform or trigger the service operations may be provided through the tag data 312 or in response to other interaction with the client device 320.

In an implementation example, NFC may be used for live-time authorization of a service operation. With live-time service operation authorization, the device can conduct live-time NFC communication during bootup and store service operation data in volatile memory, without reliance on non-volatile storage. In another implementation example, NFC and the protocols may be used to generate a token-like container or data set on the device that is considered by the existing functionality in the device, as the container or data set is consumed to authorize a specific service operation. In another implementation example, NFC may be used to modify the bootup of the device, as programmed during a previous boot cycle—for example, to use the NFC to include information to modify a next boot cycle. Then, automatically after the device is rebooted, the authorization will be removed, leaving no trace to re-authorize the same operations.

In addition to the scenarios depicted in FIG. 2 and FIG. 3, proprietary NFC or RFID tag types and communication protocols may be used for additional security and configuration operations. For example, pre-programmed credentials may be utilized by the mobile device itself to authenticate the other endpoint of the communication. Further, the client device may implement additional security attributes and verifications in addition to the NFC operations described above.

Figure 4:
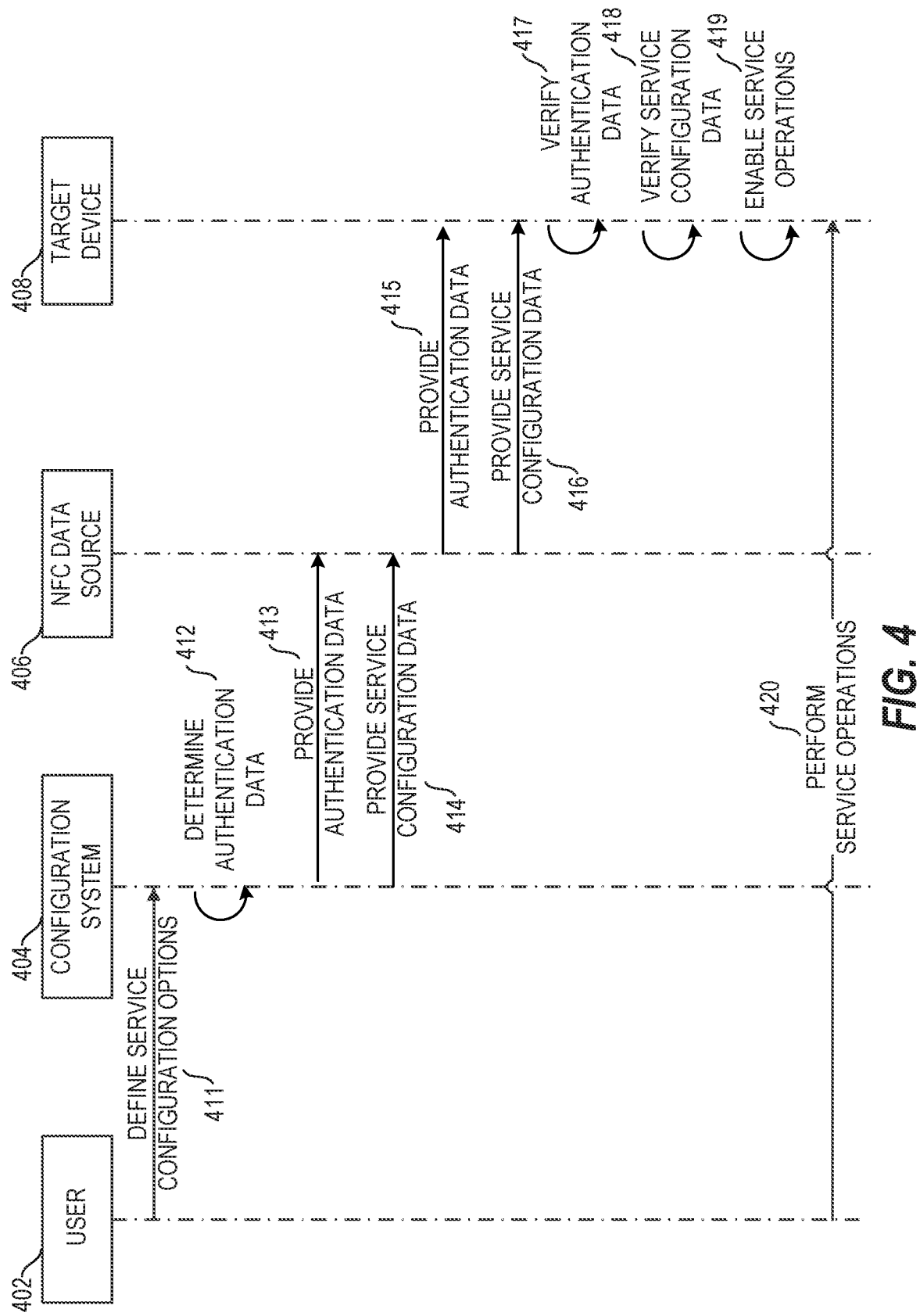
FIG. 4 illustrates a sequence diagram for deploying and verifying data used for authorizing service operations, according to an example.

FIG. 4 illustrates a sequence diagram for deploying and verifying data used for authorizing example service operations. As shown, the sequence diagram includes features of the NFC operations from the perspective of an NFC data source 406, which may operate in NFC Tag or NFC Master-Client models.

As shown in the sequence diagram of FIG. 4, a user 402 operates a configuration system 404 to define service configuration operations (operation 411) to be enabled on a target device 408 (e.g., a client device). The configuration system 404 determines authentication data (operation 412), with such authentication data being pre-programmed or determinable by the configuration system 404. The configuration system 404 then provides the authentication data (operation 413) and provides the service configuration data (operation 414) to the NFC data source 406 (e.g., an NFC tag or an NFC master communication device) for communication in an NFC payload.

The NFC data source 406 then operates to provide (e.g., transmit, allow retrieval) of the NFC payload, to provide the authentication data (operation 415) and to provide the service configuration data (operation 416) to the target device 408 via an NFC data transmission or reading operation. The target device 408 then verifies the authentication data (operation 417) and verifies the service configuration data (operation 418), in addition to any operation to determine the integrity of the payload. In response to successful verification, the service operations are enabled on the target device 408 (operation 419), such as indicated in a volatile memory location of the target device 408. In response to the service operation being enabled, or in response to an external command (from the user 402, the configuration system 404, or the NFC data source 406), the service operations are performed (operation 420). If the authentication data or the integrity of the payload is not successful, the service operations are not performed.

With the enabling of the service operations, such service operations may be configured to be enabled in volatile memory (and to be performed) only during one boot cycle of the client device. When in volatile memory, an indication of a verified set of service operations are enabled on the device, and this indication may be protected with capabilities such as memory isolation so that malware cannot tamper with it. For example, a bitmask of operations that have been enabled on the device may be stored in a protected region of the system RAM after bootup. In the bootflow, a check may be made whether a particular service capability is enabled by checking the system RAM to see whether the bitmask indicates that the capability is enabled.

The techniques described herein thus provide enhanced mechanisms for the OEMs to manage the enablement of sensitive service operations throughout the mobile device lifecycle, while decreasing OEM costs and increasing security. For example, the presently described NFC service operations may be performed without reliance on non-volatile storage for authorization data and authentication credentials. Non-volatile credentials are easily left on a shipping device if not explicitly removed after manufacturing. Non-volatile credentials may also be more susceptible for misuse and reuse across multiple devices. In contrast to this approach, the use of the presently described NFC service operations may temporarily enable operations from a secure location, without persisting the credentials onto the device or placing a digital copy into the possession of service and manufacturing personnel.

Further, the NFC service operation flows described herein may be used for the customization of the device functionality itself for large customers or device install bases—such as by having a particular feature disabled by default, and enabled on an as-needed basis by a company system administrator with a customer NFC/RFID tag. Likewise, certain features that are specific to geographic or licensing constraints could be enabled or disabled, at manufacturing or after manufacturing, through the use of NFC service operations. For example, certain software features could be enabled and disabled based on a configuration that is changeable through NFC service operations. Rather than requiring a manufacturer to maintain different SKUs or software install combinations, the NFC service operations may be used to toggle such variations on or off, on demand.

Figure 5:
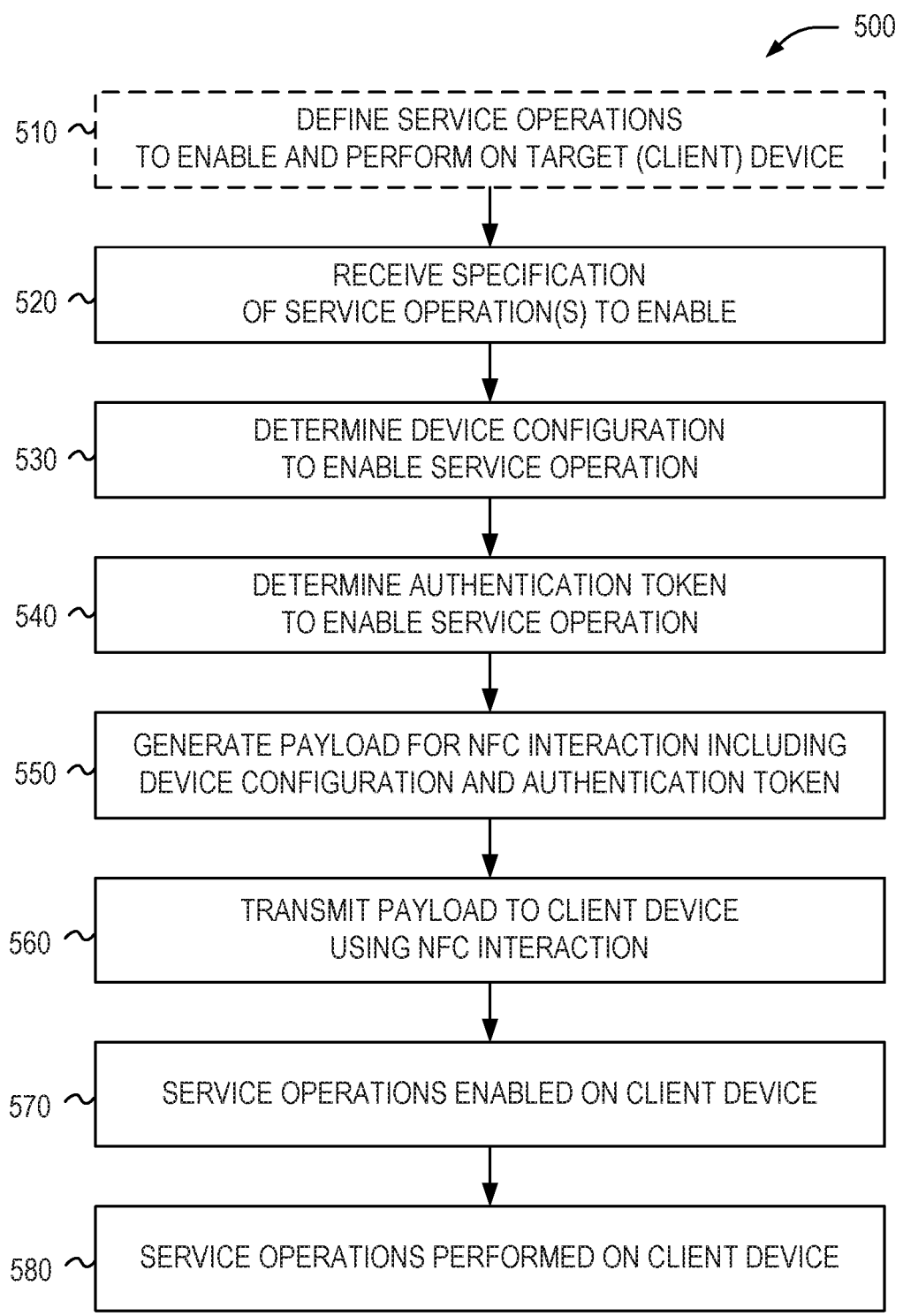
FIG. 5 illustrates a flowchart of a method performed by a configuration computing system for deploying configuration data to enable service operations, according to an example.

FIG. 5 illustrates a flowchart 500 of an example method performed by a configuration computing system for deploying configuration data for enabling service operations, implementing the techniques described herein. The following operations of the flowchart 500 may be user-controlled or automated, and may involve one or multiple devices to coordinate the configuration computing system operations.

As shown, the flowchart 500 includes an optional step of defining service operations to enable and perform on the client device (operation 510), such as with a target device (e.g., client device 240 or 320, described above). This definition of the service operation may be performed as a one-time operation (e.g., as defined at programming or manufacturing time), or repeated on user demand Based on the definition of service operations, the configuration computing system receives a specification of one or more service operations to enable on a particular client device (operation 520) or group/type of client devices.

The configuration computing system then operates to determine an appropriate device configuration to enable the service operation (operation 530), such as data values, characteristics, settings, commands, or information required to enable the service operation (and type of service operation) on the client device. This information may be determined through programmatically determined operations, or user-input information. Additionally, the configuration computing system operates to determine an authentication value (e.g., identifier, token, etc.) used to enable the service operation (operation 540). This authentication value may be specific to the device, a class of devices, a feature or function on the device, or the like.

Based on the determined device configuration and authentication value, a payload for a communication via NFC is generated (operation 550), with the payload data including device configuration data and the authentication value. This payload is then transmitted to the client device using an NFC interaction (operation 560), being either actively transmitted from the configuration computing system to the client device, or being transmitted from another NFC device or NFC tag that is programmed by the configuration computing system (including, in some examples, being transmitted from an NFC tag in response to an NFC reader inquiry). In response to the receipt of this payload, the indicated service operation(s) are enabled on the client device (operation 570). Further, in response to receipt of the payload or another determined condition (such as user input, a duration elapsing after receipt of the payload, etc.), the service operations are performed or activated on the client device (operation 580). As discussed above, these service operations may include a variety of logging, administrative, programming, or control functions that may be toggled between an enabled or disabled state, or between states that may be controlled. In some examples, enabling and performing of the service operation occur concurrently or with the same result.

Figure 6:
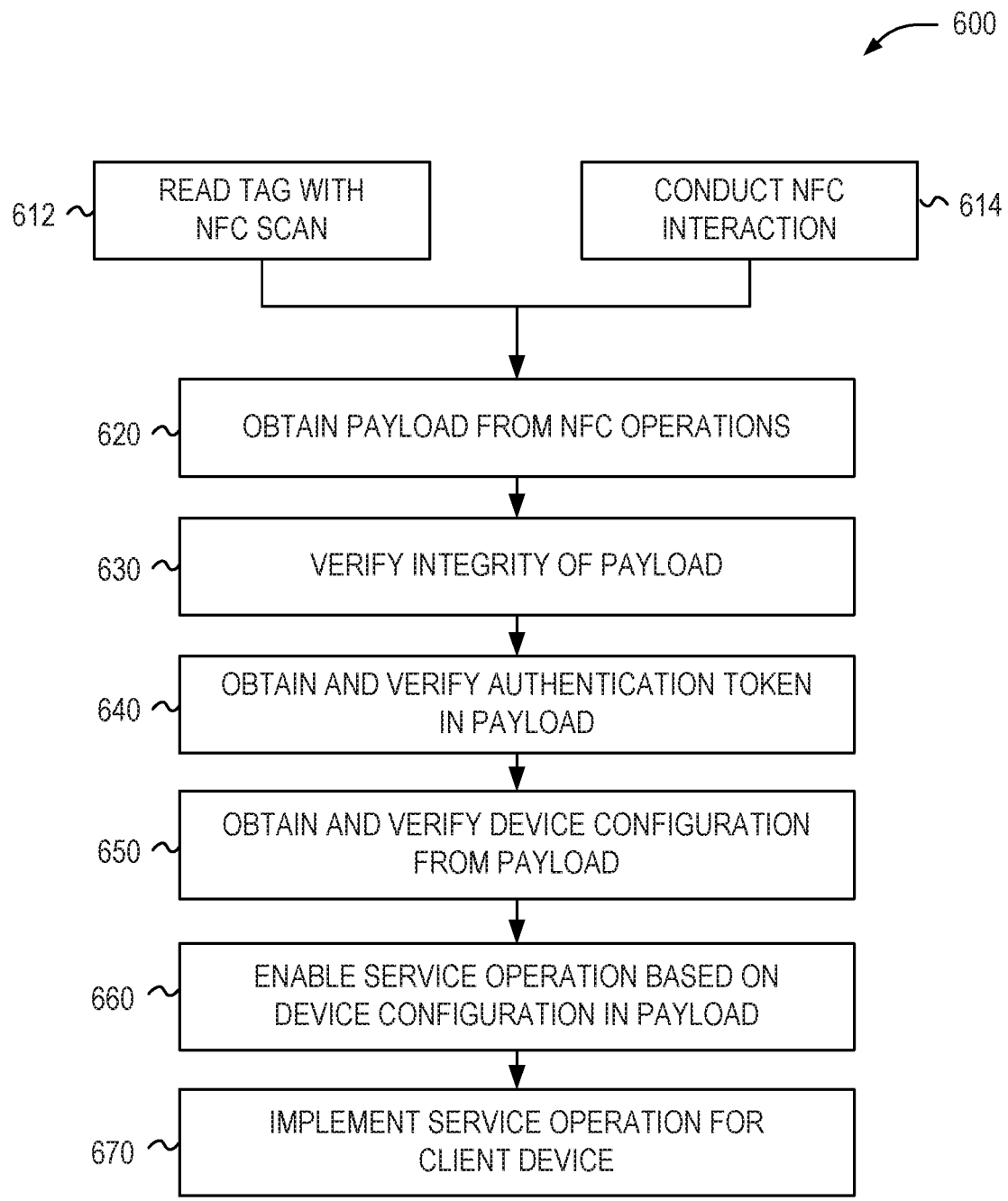
FIG. 6 illustrates a flowchart of a method performed by a client device for processing configuration data to enable service operations, according to an example.

FIG. 6 illustrates a flowchart 600 of an example method performed by a client device for processing configuration data for enabling service operations, implementing the techniques described herein. In an example, the method of flowchart 600 is executed by a target device (e.g., a client computing device such as a personal computer, tablet, smartphone), which comprises processing circuitry to perform the respective operations with the use of executed software. However, it will be understood that the following techniques may be modified for additional or substitute processing actions for other types of client or controllable devices (e.g., a wearable device, a peripheral, etc.).

As shown, the flowchart 600 includes operations for performing the NFC interaction with a source device (e.g., an NFC communication device coupled to a configuration computing system, or an NFC tag). In an example where an NFC tag provides the interaction data, the client device may use an NFC reader to read a tag with a scanning operation (operation 612). In an example where an NFC communication device provides the interaction data, the NFC interaction is conducted with communications exchanged between the source device and the client device (operation 614). As discussed above, a variety of communication protocols may be used to facilitate the NFC operations with the tag or communication device.

The client device operates to obtain the payload data from the NFC operations (operation 620), and perform operations to verify the integrity of the payload data (operation 630). In an example, if the payload data is not successfully received (e.g., is determined to be corrupted), additional NFC operations may be used to attempt to re-obtain the payload data. The authentication value included in the payload is obtained and verified (operation 640), and the device configuration included in the payload is also obtained and verified (operation 650). In some examples, the authentication value may be specific to the specific service options that are indicated in the device configuration (and thus, operation 640 may be after operation 650). Additionally, in some examples, multiple types of configurations and authentication values may be deployed for varying levels or categories of service operations.

In response to successful verification of the payload data, and successful authentication to enable the service operation, the service operation is enabled based on the indicated device configuration from the payload (operation 660). Concurrently, or at a later time, the service operation is implemented for the client device (operation 670). The service operation may be further performed, controlled, and operated based on user control or specifications of the service operation.

Figure 7:
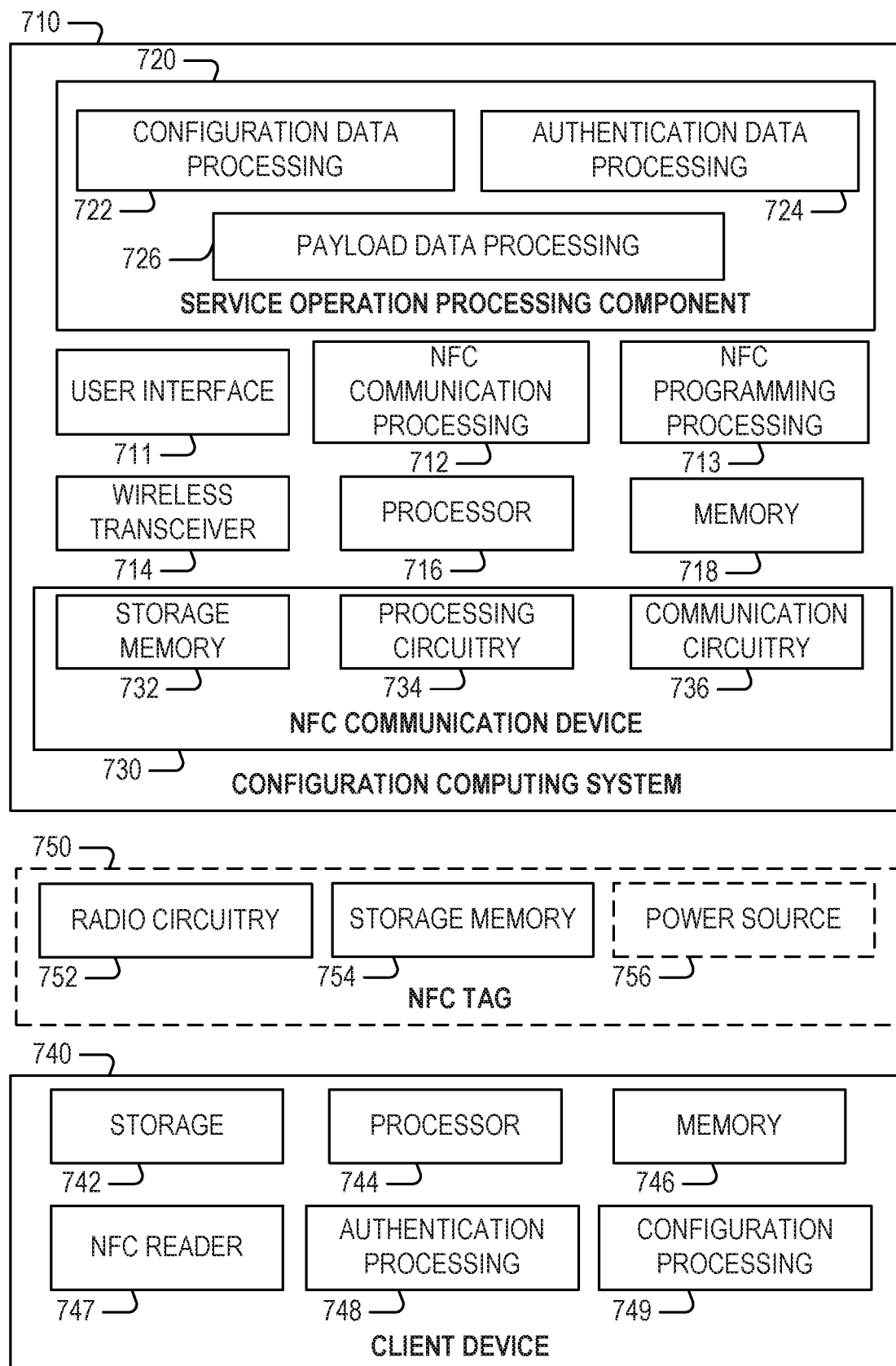
FIG. 7 illustrates a block diagram for an example service operation management system including a configuration computing system, an NFC communication device, and client device, according to an example.

FIG. 7 is a block diagram illustrating an example service operation management system including a configuration computing system 710, an NFC communication device 730, and a client device 740, implementing circuitry and structural electronic components that may be configured for implementation of the techniques described herein. In accordance with the previous described configurations, the service operation management system may have these devices operably coupled (e.g., communicatively coupled) with one another, such as with use of NFC and other wireless communications, but it will be understood that additional components (other circuitry, databases, and processing components) may be integrated at a variety of locations in the system. Further, the capabilities of the NFC communication device 730 may be, in some examples, integrated into a separate apparatus from the configuration computing system (e.g., an external NFC communication peripheral device, coupled to the configuration computing system 710 via a wired or wireless link).

The configuration computing system 710 is depicted as including a service operation processing component 720, in addition to a user interface 711 (e.g., provided by a display device), an NFC communication processing component 712, an NFC programming processing component 713, a wireless transceiver 714, a processor 716 (e.g., a CPU), and a memory 718 (e.g., volatile or non-volatile memory). In an example, the service operation processing component 720 may be provided from specialized hardware operating independent from the processor 716 and the memory 718; in other examples, the service operation processing component 720 may be software-configured hardware that is implemented with use of the processor 716 and the memory 718 (e.g., by instructions executed by the processor 716 and the memory 718).

In the configuration computing system 710, the user interface 711 may be used to output a command and control interface to receive a specification of the service operation, such as to change the service operation from a first state to a second state on the client device; the NFC communication processing component 712 may be used to generate and transmit the communication to the client device using the NFC circuitry; and the NFC programming processing component 713 (e.g., a programmer) may be used to program the NFC circuitry with the data payload. The wireless transceiver 714 may be used to perform wireless communications with communication networks, in connection with control or operation of the service operation processing component 720, the NFC communication device 730, or like NFC capabilities).

The client device 740 is depicted as including: a storage device 742, a processor 744, a memory 746, an NFC reader 747, and processing circuitry or components such as an authentication processing component 748 and a configuration processing component 749. The client device 740 may also include other components, not depicted, for implementation of NFC operations, such as input control components (e.g., buttons, touchscreen input, external peripheral devices), and output components (e.g., a touchscreen display screen, video output, etc.).

In an example, the system operates with the use of active NFC communications between the NFC communication device 730 and the NFC reader 747 of the client device 740 (such as to implement the configuration depicted in FIG. 2). In another example, the system operates with the use of passive NFC communications from the client device 740 to an NFC tag 750 (such as to implement the configuration depicted in FIG. 3). For example, the NFC tag 750 may include radio circuitry 752, storage memory 754, and an optional power source 756 to output programmed data from the NFC tag 750 to an inquiring reader (such as the NFC reader 747 of the client device 740).

The service operation processing component 720 may include processing circuitry or components adapted to implement the techniques discussed herein. This circuitry or components may be implemented through specially configured hardware (including with specialized circuitry or with software executed with use of the processor 716 and memory 718), such as configuration data processing components 722 used to determine a device configuration for a client device, with the device configuration providing an indication of a service operation capable of performance on the client device; authentication data processing components 724 used to determine an authentication value (e.g., token, identifier) for the client device, to enable the service operation; and payload data processing components 726 used to generate a payload including the device configuration and the authentication identifier for communication via the NFC communication device 730. The configuration computing system 710 may communicate the payload to the client device 740 via the NFC communication device 730 to enable (and, in some examples, perform) the service operation on the client device 740.

Although many of the previous examples were provided with reference to a master-client configuration, it will be understood that features of the presently described service operation management functions may be implemented within a cloud-based or remote processing service, as part of a standalone specialized device, or the like. Additionally, the client device 740, if embodied as a personal computing device, may include numerous other computing circuitry and components; other forms of the client device 740 may be integrated into a variety of configurations involved in NFC communication and service operation management.

Figure 8:
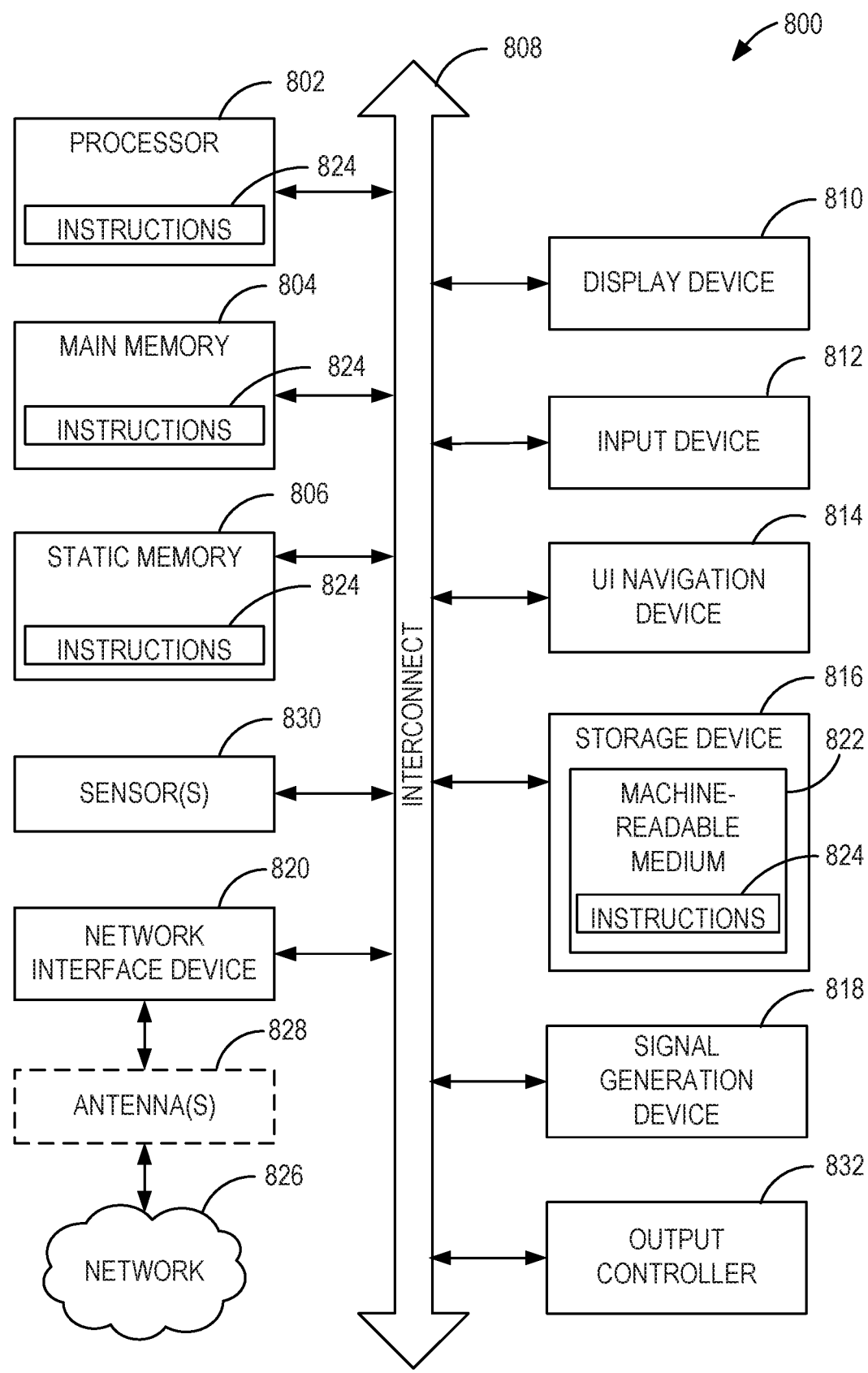
FIG. 8 illustrates a block diagram for an example computer system architecture upon which any one or more of the techniques (e.g., operations, processes, methods, and methodologies) discussed herein may be performed, according to an example.

FIG. 8 is a block diagram illustrating a machine in the example form of a computing system (e.g., computing device) 800, within which a set or sequence of instructions may be executed to cause the machine to perform any one of the methodologies discussed herein, according to an example embodiment. The machine may be a personal computer (PC), a tablet PC, a hybrid tablet/notebook PC, a personal digital assistant (PDA), a mobile telephone or smartphone, a wearable computer, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., specialized output devices such as NFC or RFID wireless communication equipment, or devices for other output formats such as a speaker), an output controller 832 (e.g., to control operation of the signal generation device 818), a network interface device 820 (which may include or operably communicate with one or more antennas 828, transceivers, or other wireless communications hardware, including with use of NFC or RFID wireless communications), and one or more sensors 830, such as NFC or RFID communication sensors, or other types of sensors such as a global positioning system (GPS) sensor, compass, accelerometer, location sensor, etc.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 via an antenna 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a computing system for service operation authorization, comprising: near-field communication (NFC) circuitry to output a wireless communication to a client device; and processing circuitry to: determine a device configuration for the client device, wherein the device configuration includes an indication of a service operation capable of performance on the client device; determine an authentication value for authentication with the client device, wherein implementation of the device configuration on the client device includes use of the authentication value; and generate a payload for the wireless communication, the payload including the device configuration and the authentication value; wherein the payload is communicated to the client device via the wireless communication to enable the service operation on the client device.

In Example 2, the subject matter of Example 1 optionally includes the processing circuitry further to: transmit the wireless communication to the client device using the NFC circuitry, wherein the NFC circuitry communicates with the client device in response to a request from an NFC reader of the client device.

In Example 3, the subject matter of any one or more of Examples 1-2 optionally include the processing circuitry further to: program the NFC circuitry with the payload, wherein the NFC circuitry is included in an NFC tag, and wherein the NFC tag operates as a passive tag that is readable in response to an NFC reader of the client device.

In Example 4, the subject matter of any one or more of Examples 1-3 optionally include the processing circuitry further to: present a graphical user interface to receive a specification of the service operation, wherein the specification of the service operation is used to change the service operation from a first state to a second state on the client device.

In Example 5, the subject matter of any one or more of Examples 1-4 optionally include the processing circuitry further to: communicate a command to the client device to perform the service operation.

In Example 6, the subject matter of any one or more of Examples 1-5 optionally include the service operation being automatically performed by the client device in response to receipt of the payload at the client device.

In Example 7, the subject matter of any one or more of Examples 1-6 optionally include, in response to receipt of the payload at the client device, the client device attempting validation of integrity for the payload and attempting verification of the authentication value, and wherein the service operation is enabled in response to successful validation of integrity for the payload and verification of the authentication value.

In Example 8, the subject matter of any one or more of Examples 1-7 optionally include the authentication value being generated using a pre-provisioned secret key known to the computing system.

In Example 9, the subject matter of any one or more of Examples 1-8 optionally include the service operation being used to control one of: provisioning of a wireless network address on wireless networking circuitry of the client device, initialization of a component feature of the client device, calibration of a component feature of the client device, enabling of a debug function in an operating system of the client device, or enabling a logging function in an operating system of the client device.

In Example 10, the subject matter of any one or more of Examples 1-9 optionally include the service operation being included in a plurality of service operations, wherein the payload includes an indication of the plurality of service operations.

Example 11 is at least one machine readable storage medium, comprising a plurality of instructions that, responsive to being executed with processor circuitry of a computing system, cause the computing system to perform electronic operations for service operation authorization that: identify a device configuration for a client device, wherein the device configuration includes an indication of a service operation capable of performance on the client device; identify an authentication value for authentication with the client device, wherein implementation of the device configuration on the client device includes use of the authentication value; and generate a payload for a wireless near-field communication (NFC) data transfer, the payload including the device configuration and the authentication value; wherein the payload is communicable to the client device via the wireless NFC data transfer to enable the service operation on the client device.

In Example 12, the subject matter of Example 11 optionally includes wherein the electronic operations further: provide a command to perform the wireless NFC data transfer to the client device using NFC circuitry of the computing system, wherein the NFC circuitry communicates with the client device in response to a request from an NFC reader of the client device.

In Example 13, the subject matter of any one or more of Examples 11-12 optionally include wherein the electronic operations further: program NFC circuitry with the payload, wherein the NFC circuitry is included in an NFC tag, and wherein the NFC tag operates as a passive tag that is readable in response to an NFC reader of the client device.

In Example 14, the subject matter of any one or more of Examples 11-13 optionally include wherein the electronic operations further: present a graphical user interface to receive a specification of the service operation, wherein the specification of the service operation is used to change the service operation from a first state to a second state on the client device.

In Example 15, the subject matter of any one or more of Examples 11-14 optionally include wherein the electronic operations further: transmit a command to the client device to perform the service operation.

In Example 16, the subject matter of any one or more of Examples 11-15 optionally include wherein the service operation is automatically performed in response to receipt of the payload at the client device.

In Example 17, the subject matter of any one or more of Examples 11-16 optionally include wherein, in response to receipt of the payload at the client device, the client device attempts validation of integrity for the payload and attempts verification of the authentication value, and wherein the service operation is enabled in response to successful validation of integrity for the payload and verification of the authentication value.

In Example 18, the subject matter of any one or more of Examples 11-17 optionally include wherein the authentication value is generated using a pre-provisioned secret key known to the computing system.

In Example 19, the subject matter of any one or more of Examples 11-18 optionally include wherein the service operation is used to control one of: provisioning of a wireless network address on wireless networking circuitry of the client device, initialization of a component feature of the client device, calibration of a component feature of the client device, enabling of a debug function in an operating system of the client device, or enabling a logging function in an operating system of the client device.

In Example 20, the subject matter of any one or more of Examples 11-19 optionally include wherein the service operation is included in a plurality of service operations, and wherein the payload includes an indication of the plurality of service operations.

Example 21 is a computing device to implement service operation authorization, the computing device comprising: a processor and a memory; near-field communication (NFC) circuitry; a configuration data processing component implemented with the processor and the memory, the configuration data processing component to determine a device configuration for a client device, wherein the device configuration includes an indication of a service operation capable of performance on the client device; an authentication data processing component implemented with the processor and the memory, the authentication data processing component to determine an authentication identifier for the client device, wherein implementation of the device configuration on the client device includes use of the authentication identifier; and a payload data processing component implemented with the processor and the memory, the payload data processing component to generate a payload for communication via the NFC circuitry, the payload including the device configuration and the authentication identifier; wherein the payload is communicated to the client device via the NFC circuitry to enable the service operation on the client device.

In Example 22, the subject matter of Example 21 optionally includes a graphical user interface implemented with the processor and memory, wherein the graphical user interface includes a plurality of input fields to receive a specification of the service operation.

In Example 23, the subject matter of any one or more of Examples 21-22 optionally include an NFC communication processing component, the NFC communication processing component to transmit the communication to the client device using the NFC circuitry, wherein the NFC circuitry communicates with the client device in response to a request from an NFC reader of the client device.

In Example 24, the subject matter of any one or more of Examples 21-23 optionally include an NFC programming processing component, the NFC programming processing component to program the NFC circuitry with the payload, wherein the NFC circuitry is included in an NFC tag, and wherein the NFC tag is readable in response to an NFC reader of the client device.

In Example 25, the subject matter of any one or more of Examples 21-24 optionally include wherein the service operation is used to control one of: provisioning of a wireless network address on wireless networking circuitry of the client device, initialization of a component feature of the client device, calibration of a component feature of the client device, enabling of a debug function in an operating system of the client device, or enabling a logging function in an operating system of the client device.

Example 26 is a system for service operation authorization, comprising: near-field communication (NFC) circuitry to output payload data; a configuration computing system, comprising: a processor and a memory; a configuration data processing component implemented with the processor and the memory, the configuration data processing component to determine a device configuration for a client device, wherein the device configuration includes an indication of a service operation capable of performance on the client device; an authentication data processing component implemented with the processor and the memory, the authentication data processing component to determine an authentication identifier for the client device, wherein implementation of the device configuration on the client device includes use of the authentication identifier; a payload data processing component implemented with the processor and the memory, the payload data processing component to generate the payload data for communication via the NFC circuitry, the payload data including the device configuration and the authentication identifier; and the client device, comprising: an NFC reader to obtain the payload data from an NFC communication with the NFC circuitry; a processor and a memory; an authentication processing component to extract the device configuration and the authentication identifier from the payload data, and perform verification of the authentication identifier; and a configuration processing component to enable the service operation in the memory of the client device, in response to verification of the authentication identifier.

In Example 27, the subject matter of Example 26 optionally includes the NFC circuitry that includes: an NFC tag, including: radio circuitry to conduct the NFC communication; and storage memory to store the data payload for use with the NFC communication.

In Example 28, the subject matter of Example 27 optionally includes the NFC tag that further includes a power source.

In Example 29, the subject matter of any one or more of Examples 27-28 optionally include the configuration computing system including an NFC programming processing component, the NFC programming processing component to program the NFC tag, wherein the NFC tag is readable in response to a query from the NFC reader of the client device.

In Example 30, the subject matter of any one or more of Examples 26-29 optionally include wherein the NFC circuitry is included in an NFC communication device, wherein the NFC communication device is coupled to the configuration computing system, wherein the NFC communication device includes: storage memory; processing circuitry to receive and process the payload data from the configuration computing system; and communication circuitry to conduct the NFC communication with the NFC reader.

Example 31 is a computing device, comprising processing circuitry to implement service operation authorization, the processing circuitry to: obtain, from an NFC device, a payload, the payload including an authentication value and a device configuration, wherein the device configuration includes an indication of a service operation capable of performance on the computing device; extract the device configuration and the authentication value from the payload; perform verification of the authentication value; and in response to verification of the authentication value, enable the service operation on the computing device.

In Example 32, the subject matter of Example 31 optionally includes the processing circuitry further to: conduct a wireless NFC data transfer with the NFC device to obtain the payload, using an NFC reader of the computing device, wherein the NFC device actively communicates with the NFC reader in response to a request from the NFC reader.

In Example 33, the subject matter of any one or more of Examples 31-32 optionally include the processing circuitry further to: operate an NFC reader of the computing device to obtain the payload, wherein the NFC device includes an NFC tag that operates as a passive tag, wherein the NFC tag is readable in response to the NFC reader of the computing device.

In Example 34, the subject matter of any one or more of Examples 31-33 optionally include wherein the device configuration is used to enable the service operation by changing a status of the service operation on the computing device from a first state to a second state, wherein the status of the service operation is indicated in a volatile memory of the computing device.

In Example 35, the subject matter of any one or more of Examples 31-34 optionally include the processing circuitry further to: receive a command from the NFC device to perform the service operation.

In Example 36, the subject matter of any one or more of Examples 31-35 optionally include wherein the service operation is automatically performed by the computing device in response to receipt of the payload.

In Example 37, the subject matter of Example 36 optionally includes the processing circuitry further to: attempt validation of integrity for the payload and attempt verification of the authentication value, in response to receipt of the payload at the computing device; wherein the service operation is enabled on the computing device in response to successful validation of integrity for the payload and verification of the authentication value.

In Example 38, the subject matter of any one or more of Examples 31-37 optionally include wherein the authentication value is generated using a pre-provisioned secret key known to the computing device.

In Example 39, the subject matter of any one or more of Examples 31-38 optionally include wherein the service operation is used to control one of: provisioning of a wireless network address on wireless networking circuitry of the computing device, initialization of a component feature of the computing device, calibration of a component feature of the computing device, enabling of a debug function in an operating system of the computing device, or enabling a logging function in an operating system of the computing device.

In Example 40, the subject matter of any one or more of Examples 31-39 optionally include wherein the service operation is included in a plurality of service operations, and wherein the payload includes an indication of the plurality of service operations.

Example 41 is at least one machine readable storage medium, comprising a plurality of instructions that, responsive to being executed with processor circuitry of a computing device, cause the computing device to perform electronic operations for service operation implementation that: obtain, from an NFC device, a payload, the payload including an authentication value and a device configuration, wherein the device configuration includes an indication of a service operation capable of performance on the computing device; extract the device configuration and the authentication value from the payload; perform verification of the authentication value; and in response to verification of the authentication value, enable the service operation on the computing device.

In Example 42, the subject matter of Example 41 optionally includes wherein the electronic operations further: conduct a wireless NFC data transfer with the NFC device to obtain the payload, using an NFC reader of the computing device, wherein the NFC device actively communicates with the NFC reader in response to a request from the NFC reader.

In Example 43, the subject matter of any one or more of Examples 41-42 optionally include wherein the electronic operations further: operate an NFC reader of the computing device to obtain the payload, wherein the NFC device includes an NFC tag that operates as a passive tag, wherein the NFC tag is readable in response to the NFC reader of the computing device.

In Example 44, the subject matter of any one or more of Examples 41-43 optionally include wherein the device configuration is used to enable the service operation by changing a status of the service operation on the computing device from a first state to a second state, wherein the status of the service operation is indicated in a volatile memory of the computing device.

In Example 45, the subject matter of any one or more of Examples 41-44 optionally include wherein the electronic operations further: receive a command from the NFC device to perform the service operation.

In Example 46, the subject matter of any one or more of Examples 41-45 optionally include wherein the service operation is automatically performed by the computing device in response to receipt of the payload.

In Example 47, the subject matter of any one or more of Examples 41-46 optionally include wherein the electronic operations further: attempt validation of integrity for the payload and attempt verification of the authentication value, in response to receipt of the payload at the computing device; wherein the service operation is enabled on the computing device in response to successful validation of integrity for the payload and verification of the authentication value.

In Example 48, the subject matter of any one or more of Examples 41-47 optionally include wherein the authentication value is generated using a pre-provisioned secret key known to the computing device.

In Example 49, the subject matter of any one or more of Examples 41-48 optionally include wherein the service operation is used to control one of: provisioning of a wireless network address on wireless networking circuitry of the computing device, initialization of a component feature of the computing device, calibration of a component feature of the computing device, enabling of a debug function in an operating system of the computing device, or enabling a logging function in an operating system of the computing device.

In Example 50, the subject matter of any one or more of Examples 41-49 optionally include wherein the service operation is included in a plurality of service operations, and wherein the payload includes an indication of the plurality of service operations.

Example 51 is a method for enabling a service operation on a remote client device, comprising electronic operations executed in processing circuitry of a computing system, wherein the electronic operations include: identifying a device configuration for the remote client device, wherein the device configuration includes an indication of the service operation capable of performance on the remote client device; identifying an authentication value for authentication with the remote client device, wherein implementation of the device configuration on the remote client device includes use of the authentication value; and generating a payload for a wireless near-field communication (NFC) data transfer, the payload including the device configuration and the authentication value; wherein the payload is communicable to the remote client device via the wireless NFC data transfer to enable the service operation on the remote client device.

In Example 52, the subject matter of Example 51 optionally includes wherein the electronic operations further include: providing a command to perform the wireless NFC data transfer to the remote client device using NFC circuitry of the computing system, wherein the NFC circuitry communicates with the remote client device in response to a request from an NFC reader of the remote client device.

In Example 53, the subject matter of any one or more of Examples 51-52 optionally include wherein the electronic operations further include: programming NFC circuitry with the payload, wherein the NFC circuitry is included in an NFC tag, and wherein the NFC tag operates as a passive tag that is readable in response an NFC reader of the remote client device.

In Example 54, the subject matter of any one or more of Examples 51-53 optionally include wherein the electronic operations further include: generating a graphical user interface to receive a specification of the service operation, wherein the specification of the service operation is used to change the service operation from a first state to a second state on the remote client device.

In Example 55, the subject matter of any one or more of Examples 51-54 optionally include wherein the electronic operations further include: transmitting a command to the remote client device to perform the service operation.

In Example 56, the subject matter of any one or more of Examples 51-55 optionally include wherein the service operations are automatically performed in response to receipt of the payload on the remote client device.

In Example 57, the subject matter of any one or more of Examples 51-56 optionally include wherein, in response to receipt of the payload at the remote client device, the remote client device attempts validation of integrity for the payload and attempts verification of the authentication value, and wherein the service operation is enabled in response to successful validation of integrity for the payload and verification of the authentication value.

In Example 58, the subject matter of any one or more of Examples 51-57 optionally include wherein the authentication value is generated using a pre-provisioned secret key known to the computing system.

In Example 59, the subject matter of any one or more of Examples 51-58 optionally include wherein the service operation is used to control one of: provisioning of a wireless network address on wireless networking circuitry of the remote client device, initialization of a component feature of the remote client device, calibration of a component feature of the remote client device, enabling of a debug function in an operating system of the remote client device, or enabling a logging function in an operating system of the remote client device.

In Example 60, the subject matter of any one or more of Examples 51-59 optionally include wherein the service operation is included in a plurality of service operations, and wherein the payload includes an indication of the plurality of service operations.

Example 61 is an apparatus comprising means for performing any of the methods of Examples 51-60.

Example 62 is a method for enabling service operations in a computing device, comprising electronic operations executed in processing circuitry of the computing device, wherein the electronic operations include: obtaining, from an NFC device, a payload, the payload including an authentication value and a device configuration, wherein the device configuration includes an indication of a service operation capable of performance on the computing device; extracting the device configuration and the authentication value from the payload; performing verification of the authentication value; and in response to verification of the authentication value, enabling the service operation on the computing device.

In Example 63, the subject matter of Example 62 optionally includes wherein the electronic operations further include: conducting a wireless NFC data transfer with the NFC device to obtain the payload, using an NFC reader of the computing device, wherein the NFC device actively communicates with the NFC reader in response to a request from the NFC reader.

In Example 64, the subject matter of any one or more of Examples 62-63 optionally include wherein the electronic operations further include: operating an NFC reader of the computing device to obtain the payload, wherein the NFC device includes an NFC tag that operates as a passive tag, wherein the NFC tag is readable in response to the NFC reader of the computing device.

In Example 65, the subject matter of any one or more of Examples 62-64 optionally include wherein the device configuration is used to enable the service operation by changing a status of the service operation on the computing device from a first state to a second state, wherein the status of the service operation is indicated in a volatile memory of the computing device.

In Example 66, the subject matter of any one or more of Examples 62-65 optionally include wherein the electronic operations further include: receiving a command from the NFC device to perform the service operation.

In Example 67, the subject matter of any one or more of Examples 62-66 optionally include wherein the service operation is automatically performed by the computing device in response to receipt of the payload.

In Example 68, the subject matter of any one or more of Examples 62-67 optionally include wherein the electronic operations further include: attempting validation of integrity for the payload and attempt verification of the authentication value, in response to receipt of the payload at the computing device; wherein the service operation is enabled on the computing device in response to successful validation of integrity for the payload and verification of the authentication value.

In Example 69, the subject matter of any one or more of Examples 62-68 optionally include wherein the authentication value is generated using a pre-provisioned secret key known to the computing device.

In Example 70, the subject matter of any one or more of Examples 62-69 optionally include wherein the service operation is used to control one of: provisioning of a wireless network address on wireless networking circuitry of the computing device, initialization of a component feature of the computing device, calibration of a component feature of the computing device, enabling of a debug function in an operating system of the computing device, or enabling a logging function in an operating system of the computing device.

In Example 71, the subject matter of any one or more of Examples 62-70 optionally include wherein the service operation is included in a plurality of service operations, and wherein the payload includes an indication of the plurality of service operations.

Example 72 is an apparatus comprising means for performing any of the methods of Examples 62-71.

Example 73 is an apparatus, comprising: means for identifying a device configuration for a remote client device, wherein the device configuration includes an indication of a service operation capable of performance on the remote client device; means for identifying an authentication value for authentication with the remote client device, wherein implementation of the device configuration on the remote client device includes use of the authentication value; and means for generating a payload for a wireless near-field communication (NFC) data transfer, the payload including the device configuration and the authentication value, wherein the payload is communicable to the remote client device via the wireless NFC data transfer to enable the service operation on the remote client device.

In Example 74, the subject matter of Example 73 optionally includes means for providing a command to perform the wireless NFC data transfer to the remote client device, by communicating with the remote client device in response to a request from an NFC reader of the remote client device.

In Example 75, the subject matter of any one or more of Examples 73-74 optionally include means for programming NFC circuitry with the payload, wherein the NFC circuitry is included in an NFC tag, and wherein the NFC tag operates as a passive tag that is readable in response an NFC reader of the remote client device.

In Example 76, the subject matter of any one or more of Examples 73-75 optionally include means for generating a graphical user interface to receive a specification of the service operation, wherein the specification of the service operation is used to change the service operation from a first state to a second state on the remote client device.

In Example 77, the subject matter of any one or more of Examples 73-76 optionally include means for transmitting a command to the remote client device to perform the service operation.

In Example 78, the subject matter of any one or more of Examples 73-77 optionally include means for automatically initiating the service operations in response to receipt of the payload on the remote client device.

In Example 79, the subject matter of any one or more of Examples 73-78 optionally include means for initiating validation of integrity for the payload and initiating verification of the authentication value on the remote client device, wherein the service operation is enabled in response to successful validation of integrity for the payload and verification of the authentication value.

In Example 80, the subject matter of any one or more of Examples 73-79 optionally include means for generating the authentication value using a pre-provisioned secret key.

In Example 81, the subject matter of any one or more of Examples 73-80 optionally include means for defining the service operation to control one of: provisioning of a wireless network address on wireless networking circuitry of the remote client device, initialization of a component feature of the remote client device, calibration of a component feature of the remote client device, enabling of a debug function in an operating system of the remote client device, or enabling a logging function in an operating system of the remote client device.

In Example 82, the subject matter of any one or more of Examples 73-81 optionally include wherein the service operation is included in a plurality of service operations, and wherein the payload includes an indication of the plurality of service operations.

Example 83 is an apparatus, comprising: means for obtaining, from an NFC device, a payload, the payload including an authentication value and a device configuration, wherein the device configuration includes an indication of a service operation to be performed; means for extracting the device configuration and the authentication value from the payload; means for performing verification of the authentication value; and means for enabling the service operation, in response to verification of the authentication value.

In Example 84, the subject matter of Example 83 optionally includes means for conducting a wireless NFC data transfer with the NFC device to obtain the payload, wherein the NFC device actively communicates in response to a request.

In Example 85, the subject matter of any one or more of Examples 83-84 optionally include means for obtaining the payload, wherein the NFC device includes an NFC tag that operates as a passive tag, wherein the NFC tag is readable in response a read operation.

In Example 86, the subject matter of any one or more of Examples 83-85 optionally include means for enabling the service operation with the device configuration by changing a status of the service operation from a first state to a second state, wherein the status of the service operation is indicated in a volatile memory of the apparatus.

In Example 87, the subject matter of any one or more of Examples 83-86 optionally include means for receiving a command from the NFC device to perform the service operation.

In Example 88, the subject matter of any one or more of Examples 83-87 optionally include means for enabling automatic performance of the service operation in response to receipt of the payload.

In Example 89, the subject matter of any one or more of Examples 83-88 optionally include means for attempting validation of integrity for the payload and attempt verification of the authentication value, in response to receipt of the payload, wherein the service operation is enabled in response to successful validation of integrity for the payload and verification of the authentication value.

In Example 90, the subject matter of any one or more of Examples 83-89 optionally include wherein the authentication value is generated using a pre-provisioned secret key.

In Example 91, the subject matter of any one or more of Examples 83-90 optionally include means for defining the service operation to control one of: provisioning of a wireless network address on wireless networking circuitry, initialization of a component feature, calibration of a component feature, enabling of a debug function in an operating system, or enabling a logging function in an operating system.

In Example 92, the subject matter of any one or more of Examples 83-91 optionally include wherein the service operation is included in a plurality of service operations, and wherein the payload includes an indication of the plurality of service operations.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing system for service operation authorization, comprising:
   near-field communication (NFC) circuitry to:

output a wireless communication to a client device with non-persistent authentication credentials; and processing circuitry to:

obtain a private key based on the non-persistent authentication credentials and a set of authorized service operations from a signing server;

determine a service operation from the set of authorized service operations to perform on the client device;

generate a set of instructions for the service operation specific to the client device, wherein the set of instructions include commands for a secure administrative-level service operation capable of performance on the client device and data values associated with the secure administrative-level service operation, and wherein the data values are restricted to transfer by a wireless NFC communication;

generate an authentication value for authentication with the client device using the private key, wherein implementation of the set of instructions on the client device includes use of the authentication value;

generate a payload for the wireless NFC communication, the payload including the set of instructions and the authentication value; and transmit the payload to the client device using the NFC circuitry;

wherein authentication of the authentication value is triggered by receipt of the authentication value, at the client device, via the wireless NFC communication, and wherein the client device restricts performance of the administrative-level service operation to a receipt of the administrative-level service operations through wireless NFC communication.

2. The computing system of claim 1, wherein the NFC circuitry communicates with the client device in response to a request received from an NFC reader of the client device.

3. The computing system of claim 1, the processing circuitry further to:

program the NFC circuitry with the payload, wherein the NFC circuitry is included in an NFC tag, and wherein the NFC tag operates as a passive tag that is readable in response to an NFC reader of the client device.

4. The computing system of claim 1, the processing circuitry further to:

present a graphical user interface to receive a specification of the service operation, wherein the specification of the service operation is used to change the service operation from a first state to a second state on the client device.

5. The computing system of claim 1, the processing circuitry further to:

communicate a command to the client device to perform the service operation.

6. The computing system of claim 1, wherein the service operation is automatically performed by the client device in response to receipt of the payload at the client device.

7. The computing system of claim 1, wherein, in response to receipt of the payload at the client device, the client device performs validation of integrity for the payload and performs verification of the authentication value, and wherein the service operation is enabled in response to successful validation of integrity for the payload and verification of the authentication value.

8. The computing system of claim 1, wherein the authentication value is generated using a pre-provisioned secret key known to the computing system.

9. The computing system of claim 1, wherein the service operation is used to control one of: provisioning of a wireless network address on wireless networking circuitry of the client device, initialization of a component feature of the client device, calibration of a component feature of the client device, enabling of a debug function in an operating system of the client device, or enabling a logging function in an operating system of the client device.

10. The computing system of claim 1, wherein the service operation is included in a plurality of service operations, and wherein the payload includes an indication of the plurality of service operations.

11. At least one non-transitory machine readable storage medium, comprising a plurality of instructions that, responsive to being executed with processor circuitry of a computing system, cause the computing system to perform electronic operations for service operation authorization that:

obtain a private key and a set of authorized service operations from a signing server for a client device, wherein the client device has non-persistent authentication credentials;

determine a service operation from the set of authorized service operations to perform on the client device;

generate a set of instructions for the service operation specific to the client device, wherein the set of instructions include commands for a secure administrative-level service operation capable of performance on the client device and data values associated with the secure administrative-level service operation, and wherein the data values are restricted to transfer by a wireless near-field communication (NFC) transfer;

generate an authentication value for authentication with the client device using the private key, wherein implementation of the set of instructions on the client device includes use of the authentication value;

generate a payload for the wireless NFC transfer, the payload including the set of instructions and the authentication value; and provide a command to perform the wireless NFC transfer of the payload to the client device using NFC circuitry of the computing system;

wherein authentication is triggered by receipt of the authentication value, at the client device, via the wireless NFC transfer and wherein the client device restricts performance of the administrative-level service operation to a receipt of the administrative-level service operation through wireless NFC transfer.

12. The non-transitory machine readable storage medium of claim 11, wherein the NFC circuitry communicates with the client device in response to a request received from an NFC reader of the client device.

13. The non-transitory machine readable storage medium of claim 11, wherein the electronic operations further:

program NFC circuitry with the payload, wherein the NFC circuitry is included in an NFC tag, and wherein the NFC tag operates as a passive tag that is readable in response to an NFC reader of the client device.

14. The non-transitory machine readable storage medium of claim 11, wherein the electronic operations further:

present a graphical user interface to receive a specification of the service operation, wherein the specification of the service operation is used to change the service operation from a first state to a second state on the client device.

15. The non-transitory machine readable storage medium of claim 11, wherein the electronic operations further:
transmit a command to the client device to perform the service operation.

16. The non-transitory machine readable storage medium of claim 11, wherein the service operation is automatically performed in response to receipt of the payload at the client device.

17. The non-transitory machine readable storage medium of claim 11, wherein, in response to receipt of the payload at the client device, the client device performs validation of integrity for the payload and performs verification of the authentication value, and wherein the service operation is enabled in response to successful validation of integrity for the payload and verification of the authentication value.

18. The non-transitory machine readable storage medium of claim 11, wherein the authentication value is generated using a pre-provisioned secret key known to the computing system.

19. The non-transitory machine readable storage medium of claim 11, wherein the service operation is used to control one of: provisioning of a wireless network address on wireless networking circuitry of the client device, initialization of a component feature of the client device, calibration of a component feature of the client device, enabling of a debug function in an operating system of the client device, or enabling a logging function in an operating system of the client device.

20. The non-transitory machine readable storage medium of claim 11, wherein the service operation is included in a plurality of service operations, and wherein the payload includes an indication of the plurality of service operations.

21. A computing device to implement service operation authorization, the computing device comprising:
a processor and a memory;
near-field communication (NFC) circuitry;
a configuration data processing component implemented with the processor and the memory, the configuration data processing component to:
obtain a private key and a set of authorized service operations from a signing server for a client device, wherein the client device has non-persistent authentication credentials;
determine a service operation from the set of authorized service operations to perform on the client device; and
generate a set of instructions for the service operation specific to the client device, wherein the set of instructions include commands for a secure administrative-level service operation capable of performance on the client device and data values associated with the secure administrative-level service operation, and wherein the data values are restricted to transfer by a wireless NFC transfer;
an authentication data processing component implemented with the processor and the memory, the authentication data processing component to generate an authentication identifier for the client device using the private key, wherein implementation of the set of instructions on the client device includes use of the authentication identifier;
a payload data processing component implemented with the processor and the memory, the payload data processing component to generate a payload for the wireless NFC transfer via the NFC circuitry, the payload including the set of instructions and the authentication identifier; and
an NFC communication processing component, the NFC communication processing component to transmit the wireless NFC transfer of the payload to the client device using the NFC circuitry;
wherein authentication of the authentication value is triggered by receipt of the authentication identifier, at the client device, via the wireless NFC transfer and wherein the client device restricts performance of the administrative-level service operation to a receipt of the administrative-level service operations through wireless NFC transfer.

22. The computing device of claim 21, further comprising:
a graphical user interface implemented with the processor and memory, wherein the graphical user interface includes a plurality of input fields to receive a specification of the service operation.

23. The computing device of claim 21, wherein the NFC circuitry communicates with the client device in response to a request received from an NFC reader of the client device.

24. The computing device of claim 21, further comprising:
an NFC programming processing component, the NFC programming processing component to program the NFC circuitry with the payload, wherein the NFC circuitry is included in an NFC tag, and wherein the NFC tag is readable in response to an NFC reader of the client device.

25. The computing device of claim 21, wherein the service operation is used to control one of: provisioning of a wireless network address on wireless networking circuitry of the client device, initialization of a component feature of the client device, calibration of a component feature of the client device, enabling of a debug function in an operating system of the client device, or enabling a logging function in an operating system of the client device.

* * * * *